United States Patent [19]

Meadows

[11] Patent Number: 4,548,858

[45] Date of Patent: Oct. 22, 1985

[54] METHOD OF MAKING A COMPRESSIBLE PRINTING BLANKET AND A COMPRESSIBLE PRINTING BLANKET PRODUCED THEREBY

[75] Inventor: Roger D. Meadows, Waynesville, N.C.

[73] Assignee: Dayco Corporation, Dayton, Ohio

[21] Appl. No.: 635,082

[22] Filed: Jul. 27, 1984

[51] Int. Cl.[4] .................. B32B 5/18; B32B 5/22; B29C 3/00

[52] U.S. Cl. .................... 428/224; 156/79; 428/246; 428/284; 428/304.4; 428/909

[58] Field of Search .............. 156/79; 428/246, 250, 428/286, 304.4, 314.4, 314.8, 316.6, 317.5, 908, 909, 305.5, 317.1, 317.7, 224, 284

[56] References Cited

U.S. PATENT DOCUMENTS

| | | | |
|---|---|---|---|
| 2,763,208 | 9/1956 | Rockoff et al. | 101/367 |
| 3,700,541 | 10/1972 | Shrimpton et al. | 428/313.5 |
| 4,025,685 | 5/1977 | Haren et al. | 428/248 |
| 4,174,244 | 11/1979 | Thomas et al. | 428/250 |
| 4,303,721 | 12/1981 | Rodriguez | 428/213 |
| 4,388,366 | 6/1983 | Rosato et al. | 428/316.6 |

Primary Examiner—William J. Van Balen
Attorney, Agent, or Firm—Joseph V. Tassone; David E. Wheeler

[57] ABSTRACT

A laminated printing blanket having compressible and resilient properties and a method for its production are provided. The compressible characteristics are provided by disposing a compressible intermediate layer having voids, between a base ply and a surface layer. The voids in the intermediate layer are produced by dispersing a blowing agent in an elastomer, sandwiching the elastomer containing the blowing agent between two fabric layers, and activating the blowing agent to produce voids. By activating the blowing agent before disposing the intermediate layer between the base ply and the surface layer, the gases from the blowing agent are prevented from migrating to the base ply or to the surface layer.

13 Claims, 2 Drawing Figures

METHOD OF MAKING A COMPRESSIBLE PRINTING BLANKET AND A COMPRESSIBLE PRINTING BLANKET PRODUCED THEREBY

BACKGROUND OF THE INVENTION

1. Field of the Invention

This invention relates to laminated printing blankets and a method of manufacturing such blankets. The type of blanket referred to herein is compressible and is used primarily in offset lithographic printing, but may also find utility in other fields of printing.

2. Prior Art Statement

The use of blankets in offset lithography is well known and has a primary function of transferring ink from a printing plate to paper. Printing blankets are very carefully designed so that the surface of the blanket is not damaged either by the mechanical contact of the blanket with the parts of the press or by chemical reaction with the ink ingredients. Repeated mechanical contacts cause a certain amount of compression of the blanket which must be within acceptable limits so that the image is properly reproduced. It is also important that the blanket have resiliency, that is, be capable of returning to its orginal thickness, and that it provide constant image transfer regardless of the amount of use to which it is put.

Printing blankets are normally composed of a substrate base material which will give the blanket integrity. Woven fabrics are preferred for this base. The base may consist of one, two, three, or more layers of fabric. The working surface, by which is meant the surface that actually contacts the ink, is usually an elastomeric layer which may be made of natural or synthetic rubber which is applied over the base layer. This is usually done by calendering or spreading rubber in layers until a desired thickness of rubber has been deposited, after which the assembly is cured or vulcanized to provide the finished blanket. Such a blanket is acceptable for many applications, but often lacks the necessary compressibility and resiliency needed for other applications. It is desirable, therefore, to produce more highly compressible blankets with improved resiliency.

It is difficult to obtain an improved compressibility factor by the standard construction described above because the rubber material, while it is highly elastomeric, is not volume compressible, and cannot be compressed in a direction at right angles to its surface without causing a distortion or stretch of the blanket in areas adjacent to the point of compression. Therefore, if irregularities exist in the printing plate, the presses, or the paper, the compression to which the blanket is exposed will vary during the printinhg operation, and the irregularities in the plates, presses and paper will be magnified by the lack of compression in the printing blanket.

It has been found that by including at least one layer of material comprising a compressible layer of resilient polymer in a printing blanket, that printing problems such as those described above, as well as "blurring" (lack of definition), caused by a small standing wave in the blanket printing surface adjacent to the nip of the printing press, can be avoided. Also, a compressible layer can serve to absorb a "smash", that is a substantial deformation thereof caused by a temporary increase in the thickness in the material to be printed, for example, by the accidental introduction of more than one sheet of paper, or the like, during the printing operation. By incorporating a compressible layer in the blanket, a "smash" can be absorbed without permanent damage to the blanket or impairment of the printing quality of the blanket. In addition, a resilient compressible layer helps to maintain the evenness of the printing surface and the thickness of the blanket after compression at the nip of the press.

Many different means of producing a compressible layer within a printing blanket are known in the art. For example, compressible layers have been formed by mixing granular salt particles with a polymer used to produce the layer, and thereafter leaching the salt from the polymer to create voids. Voids in the compressible layer make possible positive displacement of the surface layer without distortion of the surface layer since volume compression occurs and displacement of the surface layer takes place in the direction of the voids, substantially perpendicular to the impact of the press. Other methods of creating a compressible layer, such as using blowing agents, and compressible fiber structures have been used in the prior art.

For example, it is known in the art to produce a compressible printing blanket by adding and mixing particles of hydrated magnesium sulphate in the elastomeric matrix of the layer, creating a blowing effect, and leaching the particles from the matrix, producing a compressible layer which has cavities and which are interconnected by passages, as is disclosed by Haren et al, in U.S. Pat. No. 4,025,685.

In the prior art methods, the forming of the voids using blowing agents, for example, has the disadvantage that the size of the voids formed and the interconnecting of the voids is not easily controlled. Oversized voids and interconnected voids cause some areas of the printing blanket to be more compressible and less resilient than adjacent areas of the printing blanket, which results in deformations during printing. Also, the gases produced by the blowing agents sometimes wick or leak into the surface layer or the base layer of the blanket, thereby weakening or affecting the quality of the printing blanket.

One method that has been proposed to alleviate this problem is to apply pressure to the compressible layer as it is being formed as is disclosed by Rodriquez, in U.S. Pat. No. 4,303,721.

The method and construction described by Rodriguez, however, is relatively expensive to use. Also, the need for a grinding step after the foaming of the nitrile rubber makes the method described by Rodriguez labor intensive.

SUMMARY OF THE INVENTION

It is a feature of this invention to provide a method of making a printing blanket, and the printing blanket made by the method, which is free of bubbles in the surface layer and substrate layer and is relatively inexpensive to produce.

The present invention provides a compressible printing blanket comprising a base layer, a surface layer, and a compressible intermediate layer, said intermediate layer having voids produced by mixing heat activated blowing agents into the elastomeric material.

In the compressible printing blanket described, the improvement comprises the additional steps that the compressible intermediate layer is made by sandwiching elastomeric material between two layers of blanket fabric prior to heat activating the blowing agents. When the blowing agents are heat activated, the voids of the compressible layer are created prior to the disposition of the compressible intermediate layer between the base ply layer and the surface layer. By this means, the prior art problem of the gases created by the blowing agent migrating into the base layer and the surface layer is avoided.

Another feature of this invention is to provide a method of making a printing blanket comprising the steps of forming a base layer, forming a surface layer, and forming a compressible intermediate layer by disposing a blowing agent in an elastomeric material. In the method described, the improvement comprises the intermediate layer of elastomeric material being disposed between two fabric layers and subjected to a cure in order to activate the release gases from the blowing agent, producing voids in the intermediate layer prior to the disposition of the intermediate layer between the base layer and the surface layer. After the voids are created in the compressible intermediate layer by activating the blowing agent, an adhesive is spread on at least one side of the intermediate layer before disposition between the base layer and the surface layer. The assembled layers of the blanket are then subjected to heat and pressure. By this method, the blowing agent gases are released prior to the laminating step in the construction of the printing blanket, which obviates the possibility of gases produced by blowing agents from migrating to the base ply or the surface layer. At the same time, the intermediate layer is vulcanized.

Accordingly, it is the object of this invention to provide a printing blanket having one or more of the novel features set forth above or hereinafter shown or described.

DESCRIPTION OF THE PREFERRED EMBODIMENTS

Figure 1:
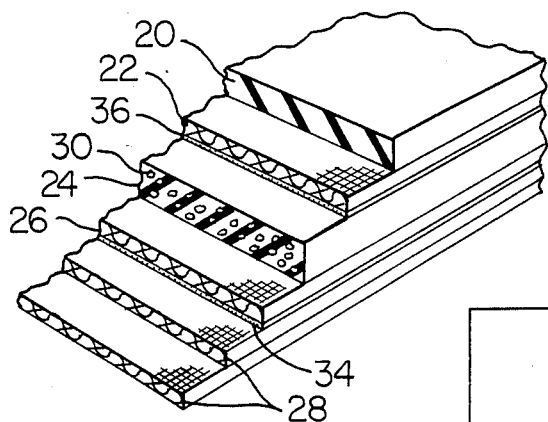
FIG. 1 illustrates a cross section of a printing blanket construction of the present invention.

Reference is now made to FIG. 1 which illustrates a printing blanket made according to the instant invention. The printing blanket, generally represented by reference numeral 10, comprises a surface layer 20, an upper reinforcing fabric layer 22, a compressible intermediate layer 24, a lower reinforcing fabric layer 26, and a base layer 28, comprising one or more fabric plys. Voids 30 in the compressible intermediate layer 24 make possible displacement of the surface layer 20 without distortion thereof. Adhesive layer 36 binds the compressible intermediate layer 24 to the reinforcing fabric layer 22.

The printing blanket of the present invention has a surface layer 20 which is smooth, substantially free of bubbles and voids such as sometimes appear in the prior art blankets when gases produced by the blowing agent migrate into the surface area. Furthermore, the base ply is free of such bubbles and voids such as are created in the prior art blankets when the gases produced by the blowing agent migrate or wick into the base layer.

Figure 2:
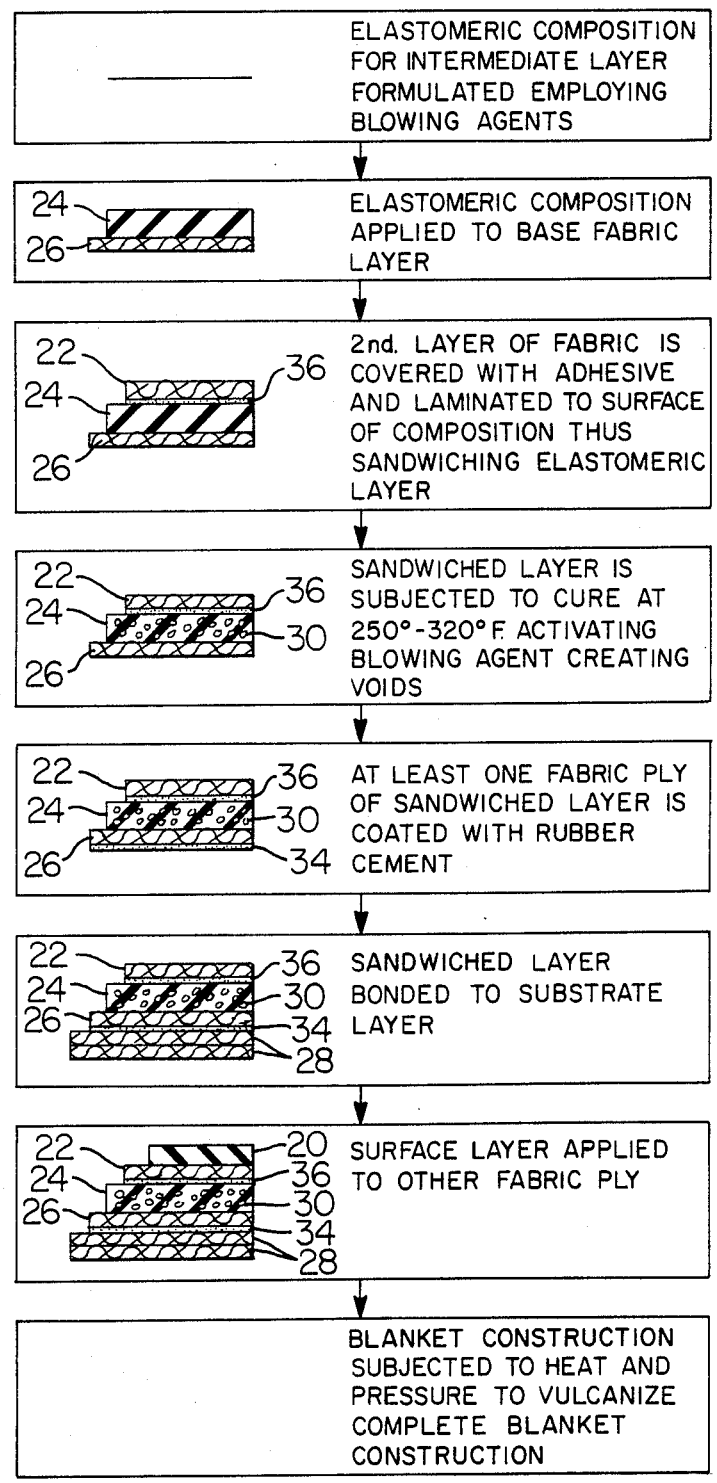
FIG. 2 is a flow diagram representing the method steps of the present invention.

Reference is now made to FIG. 2 which is a flow diagram illustrating the process steps used in making a compressible printing blanket according to the present invention. The same reference numbers are used throughout the drawings to represent the same elements of the invention.

According to the present method, the elastomeric material of the intermediate layer is formulated by conventional means incorporating conventional blowing agents. The elastomeric compound incorporating the blowing agent is spread by a conventional maeans into a layer 24 on a conventional reinforcing fabric layer 26. When the desired thickness of the layer 24 is achieved, generally in the order of 0.007 to 0.025 inch, preferably 0.010 to 0.017 inch, a second reinforcing fabric layer 22 is covered with adhesive 36 and applied to the elastomeric layer 24. Thus the layers 22, 24 and 26, and adhesive 36 form a composite sandwiched layer 50 wherein the elastomeric layer 24 is covered top and bottom with reinforcing fabric. The sandwiched layer 50 material is then subjected to heat which activates the blowing agent, and at the same time vulcanizes the layer 24. Thus, in this step, the blowing agent in the elastomeric material is activated, emitting gases which create voids 30 in the elastomeric material. The vulcanization stabilizes the elastomeric material and fixes the voids 30 as to position and size. The cure step is carried out until all the gases from the blowing agents are released.

After the elastomeric, compressible intermediate layer 24 is cured, an elastomeric adhesive 34, preferably rubber cement, is applied to at least one fabric ply 26. The adhesive will generally be applied to a thickness of 0.002 to 0.005 inch on the sandwiched layer. The sandwich layer is then bonded to the base layer 28. Thereafter, the surface layer 20 is applied in the conventional manner by applying thin coats of elastomeric material to the upper surface of fabric layer 22 of the sandwiched layer until the desired thickness of the surface layer 20 has been reached. The surface layer 20, the base layer 28, and the compressible intermediate layer 24 are then subjected to an additional vulcanizing or curing step which cures the blanket assembly. Since the gases produced by the blowing agent have been released in the first cure step of the compressible intermediate layer 24, there is no migration of gases from the blowing agent into the surface layer 20 or into the base layer 28.

The term "elastomer", as used herein, includes a composition of an elastomer with the usual processing, stabilizing, strengthening and curing additives. Elastomers that may be used in the present invention are any suitable polymeric material which is considered a curable or vulcanizable elastomeric material. Examples of such materials are natural rubber, fluoroelastomers, SBR (styrene butadiene rubber), EPDM (ethylene/-propylene/non-conjugated diene ter-polymer rubber), butyl rubber, neoprene, NBR (butyldiene-acrylonitrile rubber), polyurethanes, etc. An elastomer which is resistant to solvents and ink is preferred.

Any of the blowing agents known in the art that are activated in the desired temperature range may be used to create the voids in the compressible intermediate layer. It is preferred that the blowing agent be activated at about 200° to 310° F. In general, blowing agents that generate nitrogen, carbon dioxide, sulfur dioxide or water vapor, or mixtures thereof, can be used. Blowing agents that generate nitrogen or carbon dioxide gases are preferred. Examples of blowing agents that may be used are magnesium sulfate, hydrated salts, hydrazides such as p-toluene sulfonyl hydrazide and p,poxybisbenzene sulfonyl hydrazide, and carbonamides such as 1, 1' azobisformamide. Nitrate, nitrite, bicarbonate and carbonate salts can also be used. The vulcanizing step in the method is carried out by conventional prior art methods. Ordinarily, the vulcanizing step can be carried out at temperatures up to 200° F. to 320° F. Preferably, this step will be carried out at about 290° F. to 300° F. at pressures in the range of atmospheric to 75 psi, for about ½ to 16 hours.

The fabric layers 22, 26 and 28 are preferably made of fine plain woven fabric having lower extensibility in the warp direction (in the longitudinal or machining direction of the blanket in service), and are typically made from high grade cotton yarn, and are free from slubs and knots, weaving defects, seeds, etc. The fabric used may be for example, cotton, rayon, nylon, aramid, or polyester and may be woven or non woven. Typically, the fabric layer will be 0.005–0.020 inch thick.

Aside from the preparation of the compressible intermediate layer as described above, the printing blanket of the invention may be prepared using methods known in the art.

For production purposes, it is also possible to prepare a sandwiched compressible layer 50 for use as an intermediate layer in a printing blanket in one location and to ship to another location for fabrication of the blanket; the compressible intermediate layer, by itself, thus represents a separate feature of the instant invention.

While present exemplary embodiments of the novel product and method of this invention are illustrated and described herein, it is to be understood that the invention may be otherwise variously embodied and practical within the scope of the following claims.

What is claimed is:

1. In a method of making a printing blanket comprising the steps of forming a base layer, a surface layer, and an intermediate layer consisting essentially of a blowing agent incorporated in an elastomeric material, disposing said intermediate layer between said base layer and said surface layer, and subjecting said layers to heat and pressure; the improvement comprising, prior to the disposition of the intermediate layer between said base layer and said surface layer, the steps of providing two reinforcing fabric layers, sandwiching said intermediate layer containing said blowing agent between said two reinforcing fabric layers to produce a sandwiched layer, heating said sandwiched layer to cure the elastomeric material and to activate the release gases from said blowing agent to produce voids in said intermediate layer, and said improved steps preventing gases produced by the blowing agent from migrating to the base layer and the surface layer during said subjecting to heat and pressure.

2. A method as set forth in claim 1 in which said elastomeric material is selected from the group consisting of neoprene, fluoroelastomers, natural rubber, styrene butadiene rubber, ethylene/propylene/non-conjugated diene ter-polymer, butyl rubber, butadiene-acrylonitrile rubber, and polyurethane.

3. A method as set forth in claim 1 in which said blowing agent is a heat activated blowing agent which is activated at about 200° F. to 310° F.

4. A method as set forth in claim 1 in which said blowing agent generates a gas selected from the group consisting of nitrogen and carbon dioxide gas.

5. A method as set forth in claim 1 in which said blowing agent is selected from the group consisting of carbonates and nitrates.

6. A method as set forth in claim 1 in which the fabric of said reinforcing fabric layers is selected from the group consisting of cotton, rayon, nylon, aramid, polyester, and mixtures thereof.

7. A method as set forth in claim 1 further comprising the step of applying an elastomer based adhesive to said sandwiched layer prior to disposing said intermediate layer between said base layer and said surface layer.

8. A method as set forth in claim 7 in which said adhesive is a rubber cement.

9. A method as set forth in claim 1 in which said heating step is carried out at about 200° F. to 310° F.

10. A method as set forth in claim 1 in which said heating step is a hot air cure which is carried out at about 290° F.

11. In a compressible printing blanket comprising a base layer, a surface layer, and a compressible intermediate layer, said intermediate layer having heat activated blowing agent gas produced voids in an elastomeric material; the improvement comprising a composite compressible intermediate layer having an elastomeric material sandwiched between two reinforcing fabric layers, said elastomeric material being in a vulcanized state and having said voids incorporated therein prior to its disposition between said base layer and said surface layer.

12. In a compressible printing blanket as set forth in claim 11, in which said elastomeric material is selected from the group consisting of neoprene, natural rubber, styrene butadiene rubber, ethylene/propylene/non-conjugated diene ter polymer, butyl rubber, butadiene-acrylonitrile rubber, and polyurethane.

13. In a compressible printing blanket as set forth in claim 11, in which said reinforcing fabric is selected from the group consisting of cotton, rayon, nylon, aramid, polyester, and mixtures thereof.

* * * * *